(12) United States Patent
Huang et al.

(10) Patent No.: US 8,095,134 B2
(45) Date of Patent: Jan. 10, 2012

(54) METHOD AND APPARATUS FOR HANDOVER MEASUREMENT

(75) Inventors: Leping Huang, Saitama-ken (JP); Kodo Shu, Kanagawa (JP); Hongyuan Chen, Inagi (JP); Sari Nielsen, Espoo (FI)

(73) Assignee: Nokia Corporation, Espoo (FI)

( * ) Notice: Subject to any disclaimer, the term of this patent is extended or adjusted under 35 U.S.C. 154(b) by 1110 days.

(21) Appl. No.: 11/978,208

(22) Filed: Oct. 26, 2007

(65) Prior Publication Data

US 2008/0146231 A1 Jun. 19, 2008

Related U.S. Application Data

(60) Provisional application No. 60/854,800, filed on Oct. 27, 2006.

(51) Int. Cl.
*H04W 36/00* (2009.01)

(52) U.S. Cl. ........ 455/436; 455/437; 455/447; 370/331; 370/332

(58) Field of Classification Search .................. 455/447, 455/437, 436; 370/331, 332
See application file for complete search history.

(56) References Cited

U.S. PATENT DOCUMENTS

| | | | |
|---|---|---|---|
| 6,615,044 B2 | 9/2003 | Tigerstedt et al. | 455/437 |
| 6,711,408 B1 * | 3/2004 | Raith | 455/440 |
| 6,970,708 B1 | 11/2005 | Raith | 455/440 |
| 7,349,439 B2 * | 3/2008 | Lakkis | 370/480 |
| 7,515,928 B2 * | 4/2009 | Kang | 455/525 |
| 7,636,571 B2 * | 12/2009 | Lee et al. | 455/437 |
| 7,734,255 B2 * | 6/2010 | Matsunaga | 455/63.1 |
| 7,796,997 B2 * | 9/2010 | Kim et al. | 455/450 |
| 2002/0147024 A1 | 10/2002 | Wan | 455/515 |

(Continued)

FOREIGN PATENT DOCUMENTS

EP 1037477 7/1998

(Continued)

OTHER PUBLICATIONS

Scheduling Based Controllable Interference Coordination in OFDMA Systems, Renshui Z. et al, IEEE 2006 First International Conference on Communications and Networking in China, Oct. 25, 2006, XP031074732 Chapter 2 Scheduling Based Controllable Interference Coordination.

*Primary Examiner* — Kamran Afshar
*Assistant Examiner* — Edward Zhang
(74) *Attorney, Agent, or Firm* — Ware, Fressola, Van Der Sluys & Adolphson, LLP

(57) ABSTRACT

A UE performs pilot measurements over a frequency sub-band of serving cell and adjacent cells based on pilot symbols for used in handover. UE uses channel quality measurement result to adjust frequency sub-band and periodicity of pilot measurement. In interference coordination scheme, UE is classified into cell edge or cell center UE based on channel quality measurement result. For downlink data reception, UE in cell edge is allocated cell edge frequency sub-band and UE in cell center is allocated with cell center frequency sub-band. If UE is in cell edge of the serving cell, UE also performs pilot measurement over cell edge frequency sub-band. If UE is in cell center, UE also performs pilot measurement over cell center frequency sub-band of the serving cell. When UE is located in cell edge, it performs measurement at a higher rate than when it is located in cell center.

26 Claims, 7 Drawing Sheets

U.S. PATENT DOCUMENTS

| | | | |
|---|---|---|---|
| 2004/0097238 A1* | 5/2004 | Hwang et al. | 455/447 |
| 2005/0075110 A1* | 4/2005 | Posti et al. | 455/452.1 |
| 2005/0176468 A1* | 8/2005 | Iacono et al. | 455/562.1 |
| 2005/0249322 A1 | 11/2005 | Gerlach | 375/355 |
| 2005/0271012 A1* | 12/2005 | Agrawal et al. | 370/331 |
| 2006/0003767 A1 | 1/2006 | Kim et al. | 455/436 |
| 2006/0014538 A1* | 1/2006 | Yuan | 455/436 |
| 2006/0135075 A1* | 6/2006 | Tee et al. | 455/67.13 |
| 2006/0135164 A1 | 6/2006 | Kim et al. | 455/436 |
| 2007/0207828 A1* | 9/2007 | Cheng et al. | 455/522 |
| 2008/0123616 A1* | 5/2008 | Lee | 370/344 |

FOREIGN PATENT DOCUMENTS

WO  WO2006/077450  7/2006

\* cited by examiner

METHOD AND APPARATUS FOR HANDOVER MEASUREMENT

The present invention claims priority to a U.S. patent application No. 60/854,800, filed Oct. 27, 2006.

FIELD OF THE INVENTION

The present invention relates to wireless communication, and more particularly to the transmission in a Universal Mobile Telecommunications System (UMTS) Terrestrial Radio Access Network (UTRAN) or long term evolutions of UTRAN. The evolved UTRAN is also referred to as E-UTRAN.

BACKGROUND OF THE INVENTION

LTE, or Long Term Evolution, refers to research and development involving the Third Generation Partnership Project (3GPP), to identify technologies and capabilities that can improve systems such as the UMTS. A current working assumption for LTE is that users are explicitly scheduled on a shared channel every transmission time interval (TTI) by an eNodeB (eNB). An eNodeB is an evolved Node B or E-UTRAN Node B and is the UMTS LTE counterpart to the term "base station" in the Global System for Mobile Communication (GSM).

As can be seen in FIG. 1, the UMTS architecture consists of user equipment 102 (UE), the UMTS Terrestrial Radio Access Network 104 (UTRAN), and the Core Network 126 (CN). The air interface between the UTRAN and the UE is called Uu, and the interface between the UTRAN and the Core Network is called Iu.

The UTRAN consists of a set of Radio Network Subsystems 128 (RNS), each of which has geographic coverage of a number of cells 110 (C), as can be seen in FIG. 1.

The interface between the subsystems is called Iur.

Each Radio Network Subsystem 128 (RNS) includes a Radio Network Controller 112 (RNC) and at least one Node B 114, each Node B having geographic coverage of at least one cell 110. As can be seen from FIG. 1, the interface between an RNC 112 and a Node B 114 is called Iub, and the Iub is hard-wired rather than being an air interface. For any Node B 114 there is only one RNC 112. A Node B 114 is responsible for radio transmission and reception to and from the UE 102 (Node B antennas can typically be seen atop towers or preferably at less visible locations). The RNC 112 has overall control of the logical resources of each Node B 114 within the RNS 128, and the RNC 112 is also responsible for handover decisions which entail switching a call from one cell to another or between radio channels in the same cell.

E-UTRAN is a packet-data-based transmission system. It is required to be in coexistence with 3GPP Radio Access Technology (RAT). The Radio Access Technology is the air interface that is used to allow the link between the end user equipment and the Access Point or Base Station of Radio Access Network (RAN). In particular, E-UTRAN should be in coexistence in the same geographical area and co-location with GSM/EDGE Radio Access Network (GERAN) on adjacent channels. E-UTRAN terminals supporting UTRAN and/or GERAN operation should be able to support measurement for handover between different 3GPP RATs. In E-UTRAN, different carrier frequencies are expected to be used simultaneously. Thus, in additional to intra-frequency measurements, inter-frequency measurements are also necessary to enable inter-frequency handover.

Generally speaking, a prefix of the letter "E" in upper or lower case signifies LTE, although this rule may have exceptions. The E-UTRAN consists of eNBs (E-UTRAN Node B), providing the E-UTRA user plane (RLC/MAC/PHY) and control plane (RRC) protocol terminations towards the UE. The eNBs interface to the access gateway (aGW) via the S1, and are inter-connected via the X2.

An example of the E-UTRAN architecture is illustrated in FIG. 2. This example of E-UTRAN consists of eNBs, providing the E-UTRA user plane (RLC/MAC/PHY) and control plane (RRC) protocol terminations towards the UE. The eNBs are interconnected with each other by means of the X2 interface. The eNBs are also connected by means of the S1 interface to the EPC (evolved packet core) more specifically to the MME (mobility management entity) and the UPE (user plane entity). The S1 interface supports a many-to-many relation between MMEs/UPEs and eNBs. The S1 interface supports a functional split between the MME and the UPE. The MMU/UPE in the example of FIG. 2 is one option for the access gateway (aGW).

In the example of FIG. 2, there exists an X2 interface between the eNBs that need to communicate with each other. For exceptional cases (e.g. inter-PLMN handover), LTE_ACTIVE inter-eNB mobility is supported by means of MME/UPE relocation via the S1 interface.

The eNB may host functions such as radio resource management (radio bearer control, radio admission control, connection mobility control, dynamic allocation of resources to UEs in both uplink and downlink), selection of a mobility management entity (MME) at UE attachment, routing of user plane data towards the user plane entity (UPE), scheduling and transmission of paging messages (originated from the MME), scheduling and transmission of broadcast information (originated from the MME or O&M), and measurement and measurement reporting configuration for mobility and scheduling. The MME/UPE may host functions such as the following: distribution of paging messages to the eNBs, security control, IP header compression and encryption of user data streams; termination of U-plane packets for paging reasons; switching of U-plane for support of UE mobility, idle state mobility control, SAE bearer control, and ciphering and integrity protection of NAS signaling.

E-UTRAN supports intra-frequency (serving frequency layer), inter-frequency (non-serving frequency layer) and intra-RAT handovers. Typically, UE (user equipment) measures the power, or some other measurement quantity of Pilot channel or reference signal channel of different cells periodically. If the measurement results between the current serving cell and a neighboring cell satisfy some criteria, the UE will be handed over to the neighbor cell. The reporting criteria may be periodical or event-triggered.

An example of the UE is a mobile terminal as shown in FIG. 3. The mobile terminal has a transceiver for transmitting and receiving signals in a radio access network. The mobile terminal has a processor to process signals and data. The processed signals or data can be the pilot symbols received from the network. The mobile terminal also has a measurement module for measuring the pilot symbols for handover, for example. The measurement module can also be configured to measure channel quality, for example.

When interference coordination scheme is used, base station will allocate radio resources based on UE's location in a cell (cell center or cell edge). There are various ways to clarify whether the UE is located at the cell edge or at the cell center. For example, geographical distance, pathloss, and geometry (G)-factor can be used to determine the UE's location in a cell. The frequency sub-band allocated to a cell edge user is called a cell edge sub-band, and the frequency sub-band allocated to a cell center users is called a cell center sub-band.

The invention is related to LTE, although the solution of the present invention may also be applicable to present and future systems other than LTE.

SUMMARY OF THE INVENTION

The present invention provides an apparatus and method for handover measurements. In particular, a user equipment is configured to carry out pilot measurements over a frequency sub-band of one or more cells adjacent to the serving cell based on the pilot symbols so that the measurement results can be used in a handover event. If the user equipment is located at the cell edge section of the serving cell, the user equipment also performs the pilot measurement over a cell edge sub-band of the serving cell and the cell edge frequency sub-band of adjacent cells. Furthermore, when the user equipment is located in the cell edge, it performs the measurement at a higher rate than when the user equipment is located in the cell center section. The location of the user equipment can be determined based on the measured channel quality and/or on the frequency reuse pattern. In a soft reuse scheme, for example, the transmission power of reference symbols and/or data symbols across the cell system bandwidth can be varied according to an inter-cell interference coordination scheme as applied to the shared data channel. This treatment of transmission power is also known as a static interference control scheme.

Thus, the first aspect of the present invention is a method, which comprises:

processing pilot symbols in a user equipment device in a radio access network, the user equipment device located in a serving cell;

performing handover measurement over a frequency sub-band of an operating bandwidth of the serving cell and one or more different frequency sub-bands of one or more cells adjacent to the serving cell based on the pilot symbols for obtaining a handover measurement result; and conveying the handover measurement result to a network component in the radio access network for deciding whether to carry out a handover event at least partly based on the handover measurement result.

If the handover measurement result meets a predetermined criteria, one of adjacent cells is selected for the handover event According to one embodiment of the present invention, the method further comprises:

determining whether the user equipment device is located in the cell-center section or in the cell-edge section, wherein said handover measurement is performed at least partly based on such determination.

According to one embodiment of the present invention, the method further comprises:

measuring channel quality of the serving cell for obtaining a channel quality measurement result, and determining whether the user equipment device is located in the cell-center section or in the cell-edge section at least partly based on the channel quality measurement result.

Alternatively, whether the user equipment is located in the cell-center section or in the cell-edge section is determined at least partly based on a frequency reuse pattern in the operation bandwidth.

According to another embodiment of the present invention, the method further comprising:

measuring channel quality of the serving cell for obtaining a channel quality measurement result, and determining said one or more different frequency sub-bands for performing the handover measurement on said one or more adjacent cells based on the channel quality measurement result.

According to one embodiment of the present invention, the method further comprise:

allocating the cell-edge frequency sub-band to the user equipment device for downlink data reception in the user equipment device when the user equipment device is located in the cell-edge section, and allocating the cell-center frequency sub-band to the user equipment device for downlink data reception in the user equipment device when the user equipment device is located in the cell-center section.

When the user equipment is located in the cell-edge section, the handover measurement is performed over the cell-edge frequency sub-band of the serving cell and said one or more different frequency sub-bands of the adjacent one or more cells.

Furthermore, when the user equipment device is located in the cell-edge section of the serving cell, the handover measurement is performed with a first measurement rate, and when the user equipment is located in the cell-center section of the serving cell, the handover measurement is performed with a second measurement rate smaller than the first measurement rate.

According to one embodiment of the present invention, the first measurement rate is dependent upon the moving speed.

According to embodiments of the present invention, the handover event is carried out in an intra-frequency fashion or in an inter-frequency fashion.

The second aspect of the present invention is a method, which comprises:

measuring channel quality of a serving cell in a radio access network for obtaining a channel quality measurement result, wherein the radio access network comprises a serving cell and a plurality of adjacent cells adjacent to the serving cell, and a user equipment device located in the serving cell, and wherein the user equipment device is configured to receive and process pilot symbols; and determining, based on the channel measurement result, whether a handover measurement based on the pilot symbols is carried out, and a time interval for performing the handover measurement.

According to one embodiment of the present invention, the method further comprises:

comparing the channel quality measurement indicative of the channel quality of the serving cell to a predetermined quality value, so that when the channel quality of the serving cell is equal to or higher than the predetermined quality value, performing the handover measurement with a longer time interval, and when the channel quality of the serving cell is lower than the predetermined quality level, performing the handover measurement with a shorter time interval.

According to one embodiment of the present invention, the channel quality measurement result is used to determine whether the user equipment device is located in the cell-center section or in the cell-edge section. Alternatively, whether the user equipment is located in the cell-center section or in the cell-edge section is determined at least partly based on a frequency reuse pattern.

The third aspect of the present invention is an apparatus, which comprises:

a receiver for receiving pilot symbols in a radio access network, wherein the apparatus is located in a serving cell in the radio access network;

a measurement module configured for performing handover measurement over a frequency sub-band of serving cell and one or more different frequency sub-bands of one or more cells adjacent to the serving cell based on the pilot symbols for obtaining a handover measurement result; and a transmitter for conveying the handover measurement result to a network component in the radio access network for deciding a handover event at least partly based on the handover measurement result.

According to one embodiment of the present invention, the measurement module is also configured for performing channel quality measurement of the serving cell for providing a channel quality measurement result so as to determine whether the apparatus is located in the cell-edge section or in the cell-center section based on the channel quality measurement result; and wherein the handover measurement is performed at least partly based on whether the apparatus is located in the cell-edge section or located in the cell-center section.

According to another embodiment of the present invention, the measurement module is also configured for performing channel quality measurement of the serving cell for providing a channel quality measurement result. The apparatus further comprises:

a determining module configured for determining, based on the channel quality measurement result, whether the handover measurement is carried out, and a time interval for the handover measurement.

According to one embodiment of the present invention, when the channel quality measurement result is equal to or higher than the predetermined quality value, performing the handover measurement with a longer time interval, and when the channel quality measurement result is lower than the predetermined quality level, performing the handover measurement with a longer time interval.

The frequency sub-band and said one or more different frequency sub-bands can be determined based on the channel quality measurement result, for example.

The fourth aspect of the present invention is a wireless communications network, which comprises:

a first network component, and a second network component configured for communication with the first network component, wherein the first network component is located in a first cell adjacent to one or more second cells, each of the first and second cells having a frequency sub-band, and wherein the first network component comprises:

means for receiving pilot symbols in a radio access network, wherein the first network component is located in a serving cell of the radio access network and means for performing handover measurement over a frequency sub-band of serving cell and one or more cells adjacent to the serving cell based on the pilot symbols, based on the received pilot symbols, and for providing handover measurement result to the second network component; and the second network component is configured for deciding whether to carry out a handover event for the first network component at least partly based on the handover measurement results.

The fifth aspect of the present invention is an apparatus, which comprises:

means for receiving pilot symbols in a radio access network, wherein the apparatus is located in a serving cell in the radio access network;

means for performing handover measurement over a frequency sub-band of serving cell and one or more different frequency sub-bands of one or more cells adjacent to the serving cell based on the pilot symbols for obtaining a handover measurement result; and means for conveying the handover measurement result to a network component in the radio access network for deciding a handover event at least partly based on the handover measurement result.

According to one embodiment of the present invention, the apparatus further comprises:

means for performing channel quality measurement of the serving cell for providing a channel quality measurement result, so that whether the apparatus is located in the cell-edge section or in the cell-center section is determined based on the channel quality measurement result; and that the handover measurement is performed at least partly based on whether the apparatus is located in the cell-edge section or located in the cell-center section.

According to another embodiment of the present invention, the apparatus further comprises:

means for performing channel quality measurement of the serving cell for providing a channel quality measurement result, and means, based on the channel quality measurement result, for determining whether the handover measurement is carried out, and a time interval for the handover measurement.

The sixth aspect of the present invention is a software application product or a computer readable medium comprising a software program embedded therein. The software program comprises programming codes for:

processing pilot symbols in a user equipment device in a radio access network, the user equipment device located in a serving cell;

performing handover measurement over a frequency sub-band of an operating bandwidth of the serving cell and one or more different frequency sub-bands of one or more cells adjacent to the serving cell based on the pilot symbols for obtaining a handover measurement result; and:

conveying the handover measurement result to a network component in the radio access network for deciding whether to carry out a handover event at least partly based on the handover measurement result.

According to one embodiment of the present invention, the software program further comprises programming codes for:

determining whether the user equipment device is located in the cell-center section or in the cell-edge section, wherein said handover measurement is performed at least partly based on such determination.

According to one embodiment of the present invention, the software program further comprises programming codes for:

measuring channel quality of the serving cell for obtaining a channel quality measurement result, and determining whether the user equipment device is located in the cell-center section or in the cell-edge section at least partly based on the channel quality measurement result.

According to another embodiment of the present invention, the software program further comprises programming codes for:

measuring channel quality of the serving cell for obtaining a channel quality measurement result, and determining said one or more different frequency sub-bands for performing the handover measurement on said one or more adjacent cells based on the channel quality measurement result.

According to embodiments of the present invention, the software program further comprises programming codes for:

allocating the cell-edge frequency sub-band to the user equipment device for downlink data reception in the user equipment device when the user equipment device is located in the cell-edge section, and allocating the cell-center frequency sub-band to the user equipment device for downlink data reception in the user equipment device when the user equipment device is located in the cell-center section.

When the user equipment is located in the cell-edge section, the handover measurement is performed over the cell-edge frequency sub-band of the serving cell and said one or more different frequency sub-bands of the adjacent one or more cells.

When the user equipment device is located in the cell-edge section of the serving cell, the handover measurement is performed with a first measurement rate, and when the user equipment is located in the cell-center section of the serving cell, the handover measurement is performed with a second measurement rate smaller than the first measurement rate.

The software program further comprises programming codes for:

selecting one of said one or more cells for the handover event if the handover measurement result meets a predetermined criteria.

According to one embodiment of the present invention, the software program further comprises programming codes for:

determining whether the user equipment is located in the cell-center section or in the cell-edge section at least partly based on a frequency reuse pattern in the operation bandwidth.

According to a different embodiment of the present invention, the software program further comprises programming codes for:

measuring channel quality of a serving cell in a radio access network for obtaining a channel quality measurement result, wherein the radio access network comprises a serving cell and a plurality of adjacent cells adjacent to the serving cell, and a user equipment device located in the serving cell, and wherein the user equipment device is configured to receive and process pilot symbols;

determining, based on the channel measurement result, whether a handover measurement based on the pilot symbols is carried out, and a time interval for performing the handover measurement; and comparing channel quality measurement indicative of the channel quality of the serving cell to a predetermined quality value, so that when the channel quality of the serving cell is equal to or higher than the predetermined quality value, performing the handover measurement with a longer time interval, and when the channel quality of the serving cell is lower than the predetermined quality level, performing the handover measurement with a shorter time interval.

The present invention will become apparent upon reading the description taken in conjunction with FIGS. 1 to 8.

BRIEF DISCUSSION OF THE DRAWINGS

FIG. 1 shows a UMTS architecture.
FIG. 2 shows an example of the E-UTRAN architecture.
FIG. 3 shows a user equipment, such as a mobile terminal.
FIG. 4a illustrates different measurement strategy and measurement results in respect of bandwidth, wherein the cell planning is carried out as in a reuse-3 network.
FIG. 4b illustrates the use of two power masks in the time/frequency domain based on the different cell types.

DETAILED DISCUSSION OF THE INVENTION

Figure 1:
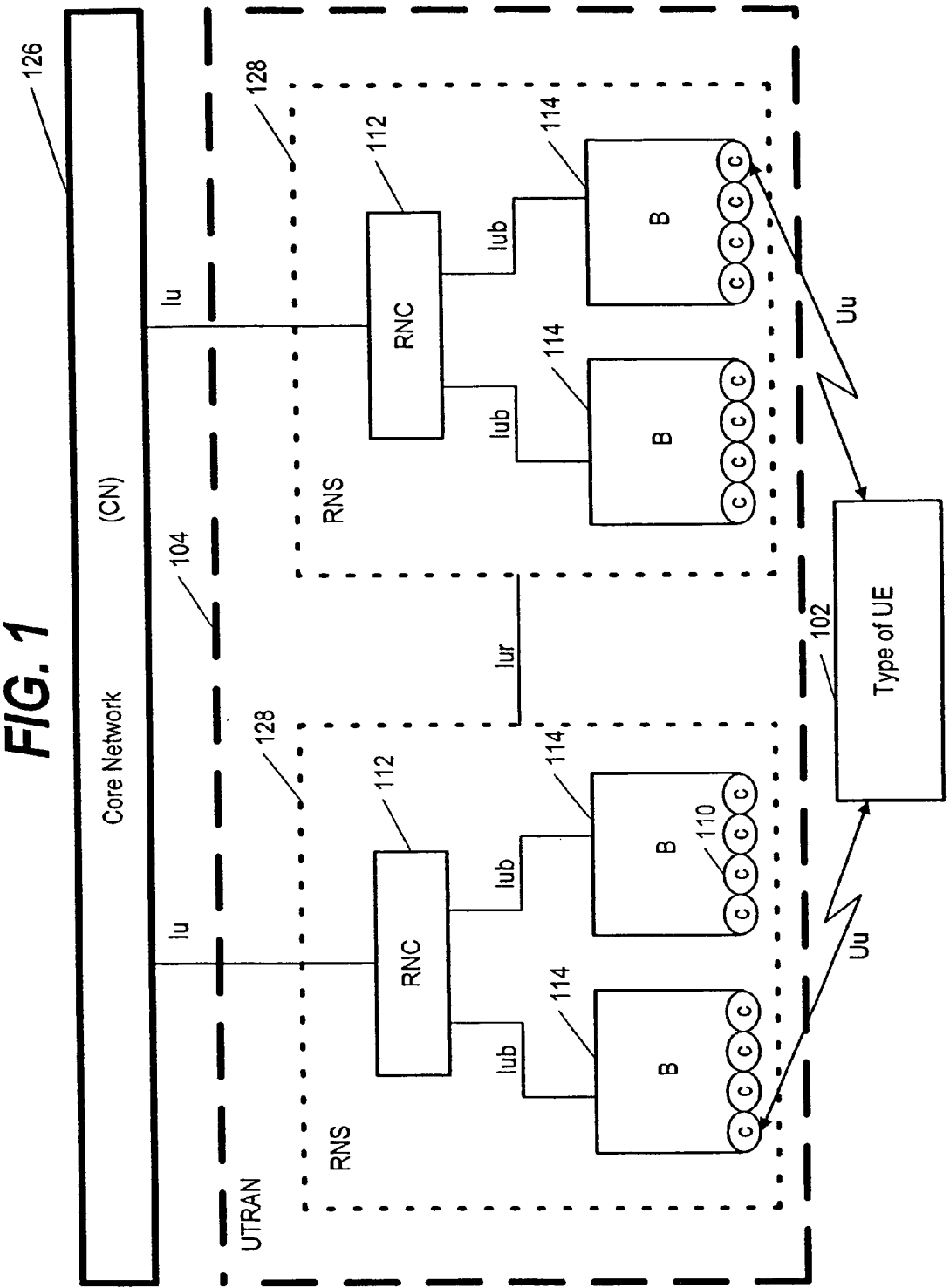
Figure 2:
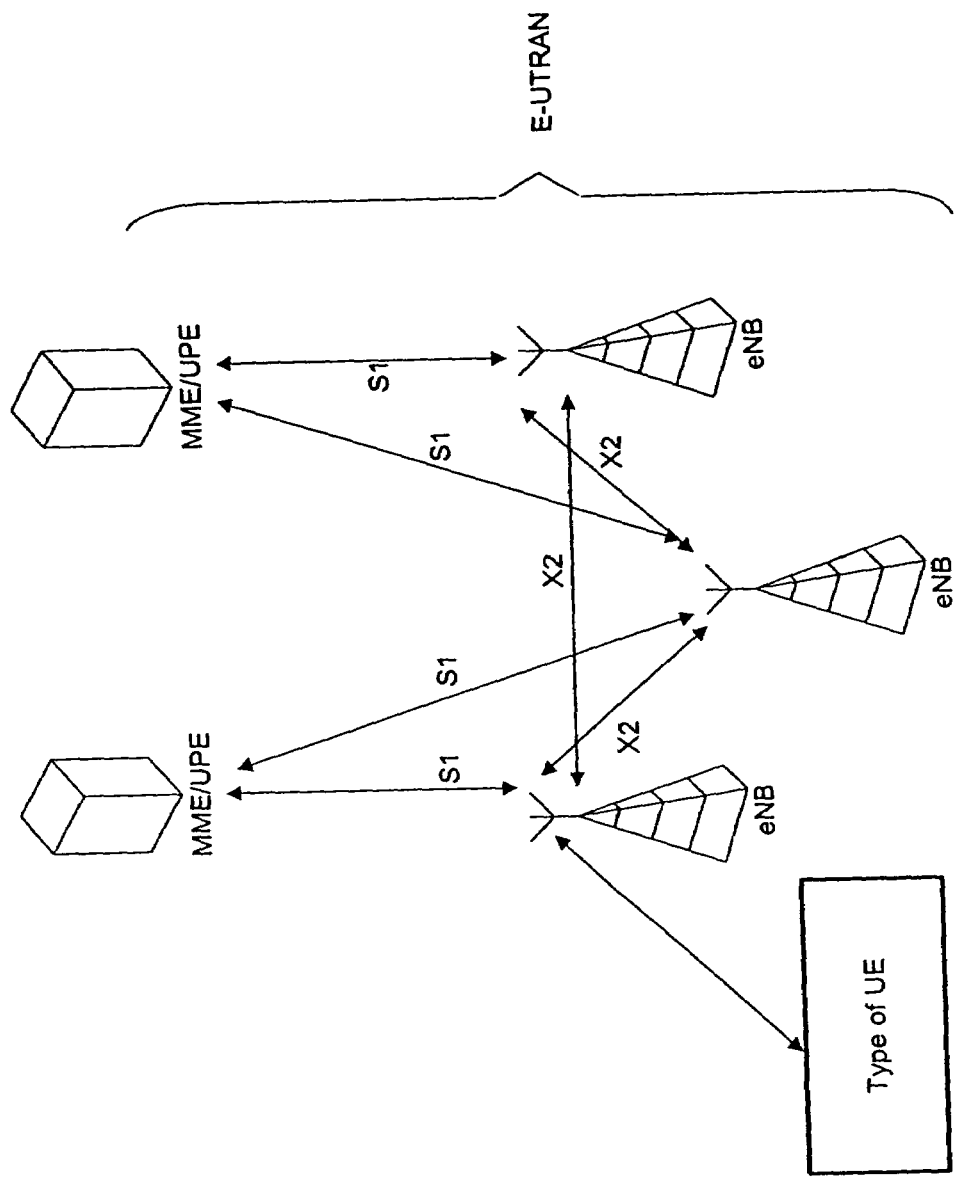
Figure 3:
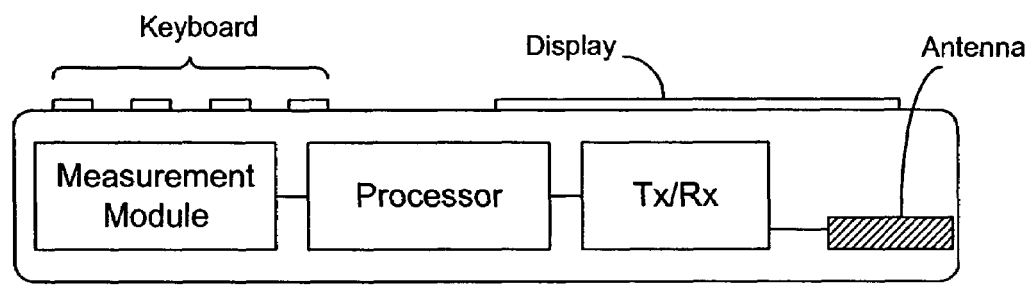

Interference control (IC) or coordination is a scheme to improve the cell-edge performance of E-UTRAN, which intends to mitigate the inter-cell interference especially under the frequency reuse-1 constraint.

The common theme of inter-cell-interference coordination/avoidance is to apply restrictions to downlink resource management in a coordinated way between cells. These restrictions can be in the form of restrictions to what time/frequency resources are available to the resource manager or restrictions on the transmitting power that can be applied to certain time/frequency resources.

For the common reference symbols, the power can be equal across the full cell system, or the power of the reference symbols follow the power level of the physical resources blocks (PRBs) of the non-common channels (i.e., the shared data channel). For the shared data channel where certain frequency resources are transmitted with reduced power, soft frequency reuse can be employed in order to reduce interference to the adjacent cells. Where there is no transmission on certain frequency resources, it is possible to use hard frequency reuse.

Reference symbol transmitting power is likely to affect several types of UE measurements: Channel Quality Information (CQI), handover and cell reselection measurements and channel estimation. The present invention is more concerned with UE measurements for handover and cell reselection evaluation in a network where inter-cell-interference coordination is in use.

When a static IC scheme (e.g. soft reuse) is applied at DL (downlink), eNodeB may transmit data symbols in different resource blocks (RBs) with different transmission power levels. Regarding the transmission power of pilot symbols, there are two design choices: (1) the pilot symbol is transmitted with constant power over the entire bandwidth, and (2) the same power sequence is applied to the pilot symbol as applied to the data symbol.

It has been found that, in the design choice (1), the UE is scheduled with DL resource at certain resource-blocks (RBs) depending on its channel state information. The Pilot measurement over certain frequency bands (e.g. either full bandwidth, or central 1.25 MHz) cannot precisely represent or estimate the channel quality of the RBs of the data channel. In the design choice (2), in addition to the problem associated with the Pilot measurement, the UE cannot derive the accurate Pilot Signal Strength Indicator (PSSI) by calculating the arithmetic average of the pilots over the full bandwidth directly. These problems seem to have arisen from the fact that pilots are transmitted with different powers at different resource blocks.

The present invention provides a method for pilot or symbol measurement when static interference control (IC) is used in LTE RAN and when the transmission power of the reference symbols and/or data symbols across the cell system bandwidth can be varied according to the inter-cell-interference coordination scheme applied for the shared data channel (i.e., the non-common channels). In order to avoid potential measurement uncertainty, the UE is configured for performing measurements over a certain sub-band for which measurements are comparable.

When the transmitting power for reference symbols is not equal over the whole cell system bandwidth, in order to provide optimal handover and cell re-selection measurement for different E-UTRAN networks using different inter-cell-interference control schemes for the non-common channels (shared data channels), some additional signaling may be needed. The additional signaling is used to indicate over which frequencies within the DL cell system bandwidth and to indicate that the UE may need to perform reference signal level measurement. It is also possible that one single measurement solution for systems with and without interference coordination is sufficient. In order to ensure good mobility support within E-UTRA (within serving frequency layer and between frequency layers) and between E-UTRA and other RATs, it is important to ensure accurate and comparable UE measurements.

For intra-frequency (serving frequency layer) mobility, it is more beneficial to measure those frequency sub-bands where UE has higher probability to be allocated for data reception. When the interference coordination scheme is used, the network allocates DL resource to UE from a certain frequency sub-band depending on UE's cell status (cell edge or cell center). Furthermore, in both Channel Quality Information (CQI) measurement and Pilot handover (HO) measurement, the channel quality and/or signal strength are measured. For that reason, it would be beneficial to have a tight interaction between CQI measurement for IC and HO measurement. When the static IC scheme is applied, there is a small possibility to hand over the UE from the cell center of one cell to another cell in the serving frequency layer directly. In most of the situations, however, the UE is handed over from a cell-edge sub-band of the serving cell to a cell-edge sub-band of the target cell. Here the cell-edge sub-band is used to provide services with high priorities to users that are categorized as cell-edge users and thus, typically the highest transmitting power is used on these cell-edge sub-bands.

When a UE is within the cell edge of its serving cell, it always measures the pilots over the cell-edge sub-band of both the serving cell and the neighboring cells of the serving frequency layer. The measurement results are reported to the network and the measurement results are used in HO decision algorithm. Additionally, if inter-frequency (non-serving frequency layer) and inter-RAT neighbor cell measurements are requested from the UE, the UE may also be required to measure the pilots of some other sub-bands or the entire DL operating bandwidth in order to make the measurements with other frequency layers or RAT comparable in the measurement report. Because the measurement on different sub-bands of the whole DL operating bandwidth can be carried out at the same time, the measurement will not consume extra power.

When a UE is within the cell center of its serving cell, two ways of measurement can be carried out. In the first approach: the UE measures the cell-edge sub-band of both the serving and the neighboring cells, and uses the measurement results as inputs to the HO decision algorithm (especially for handovers within the serving frequency layer). When the UE is in the cell center, the probability of handover is much lower than when it is at the cell edge. For that reason, the UE may choose to carry out the HO measurement very infrequently (e.g. once per 1 s). The control of changing the measurement frequency can either be done indirectly based on the UE requirements or directly through some specific criteria (or signaling). Especially for DRX (Discontinuous Reception) operations, it may be desirable to allow variations in the UE measurement frequency for power saving purposes. In order to allow an operator to have more control over the UE measurement frequency, a specific signaling bit can be defined to allow this kind of operation for a UE. The measurement frequency may also depend on the UE speed such that the measurements are made more frequently when the UE speed is high. Here the term "frequency" is referred to as the number of measurements within a certain period of time.

Figure 4A:
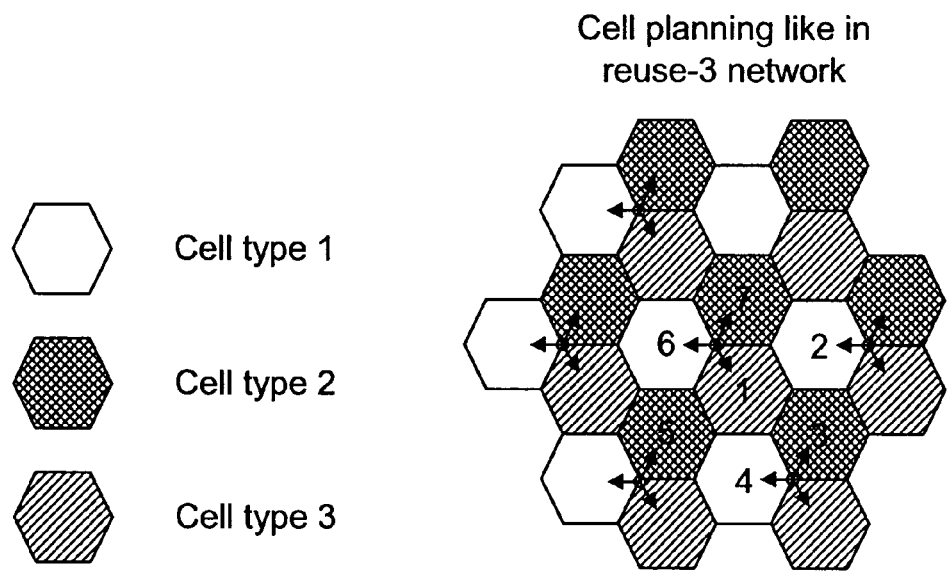
Figure 4B:
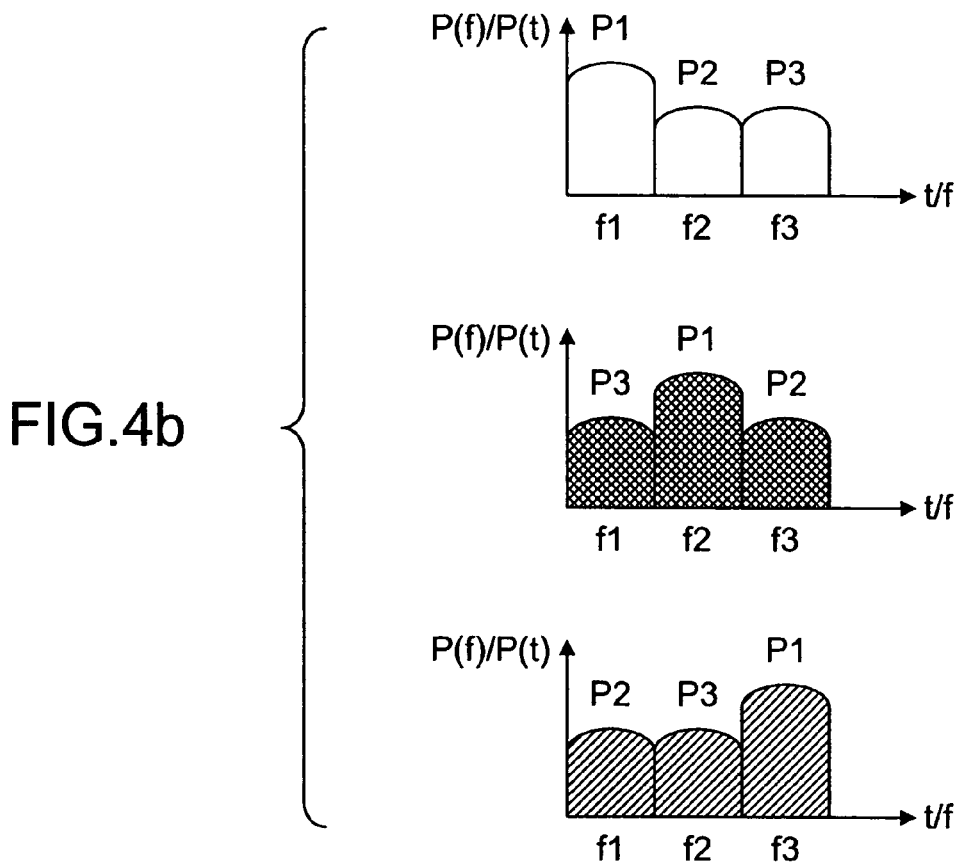

Let us use FIGS. 4a and 4b to illustrate the behavior of a UE connected to cell 1. In this example, a reuse-3 static IC scheme is applied to the entire network, and two power levels are used. FIG. 4a illustrates the locations of different cells. Different power masks in the time/frequency domain are used in the different cell types, as shown in FIG. 4b.

When a UE is at the cell edge of cell 1, it conducts measurements on f3 of cell 1, f1 of cell 2, cell 4, cell 6, and f2 of cell 3, cell 5, cell 7. When the UE is at the cell center of cell 1, it also conducts measurements on f3 of cell 1, f1 of cell 2, cell 4, cell 6 and f2 of cell 3, cell 5, cell 7, but the measurements are carried out less frequently than when the UE is at the cell edge. For example, the measurement made when the UE is at the cell edge is once every 50 ms, whereas the measurement made when the UE is at the cell center is once every 1 s. All the measurements are reported to the network for handover decision.

Figure 5:
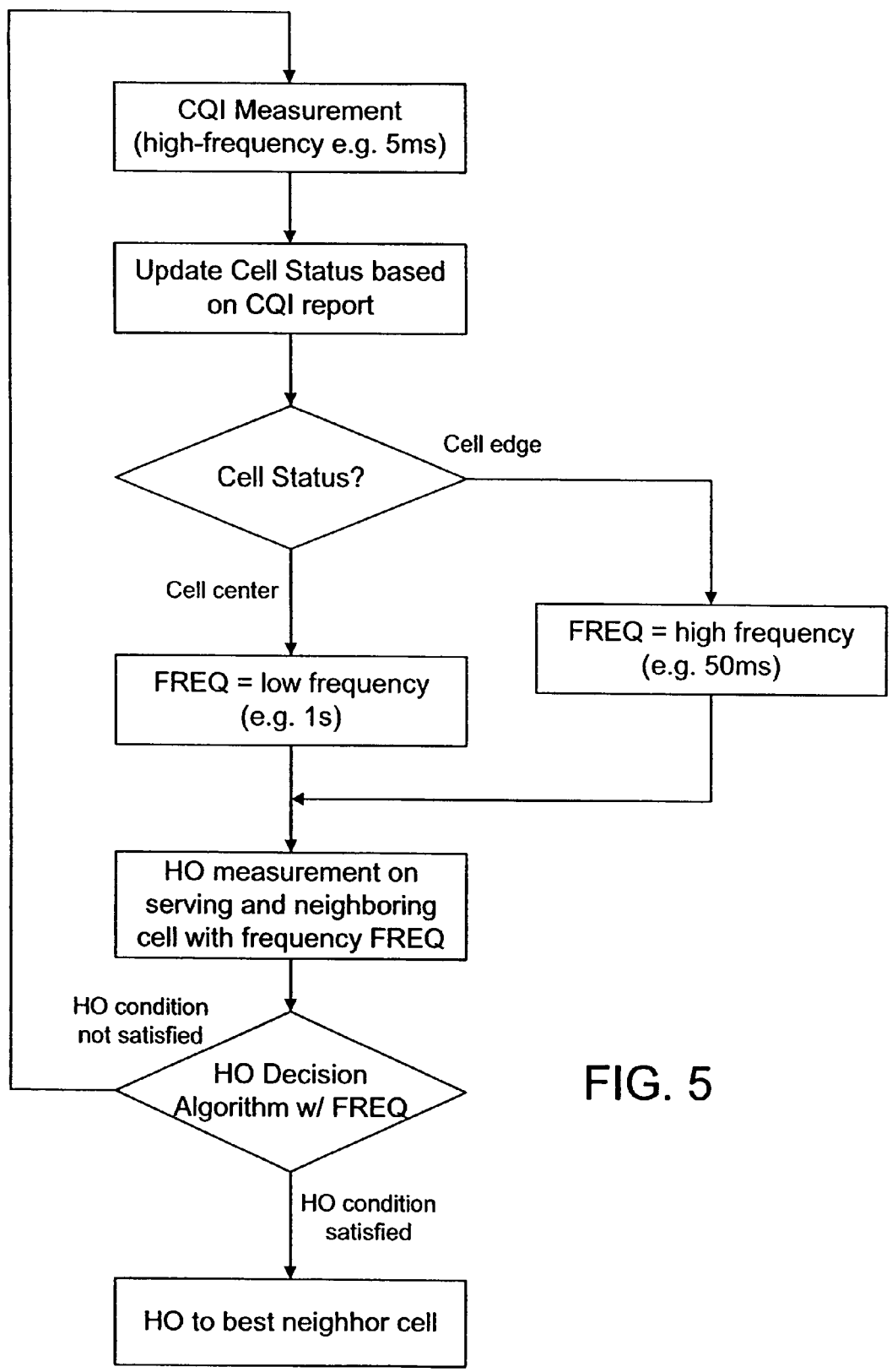
FIG. 5 is a flowchart illustrating the measurement approach, according to one embodiment of the present invention.

The measurement in the first approach is illustrated in FIG. 5.

In the second approach, when a UE is at the cell edge of cell 1, it conducts measurements on f3 of cell 1, f1 of cell 2, cell 4, cell 6, and f2 of cell 3, cell 5, cell 7, as in the first approach. The measurements at the cell edge are reported to the network for handover decision, based on the comparison of the PSSI (Pilot Signal Strength Indicator) of neighboring cells with that of serving cell, for example. When the UE is at the cell center of its serving cells, it conducts measurements on f1 of cell 2, cell 4, cell 6, and f2 of cell 3, cell 5, cell 7, but not on cell 1. The measurements are carried out less frequently than when the UE is at the cell edge. For example, the measurement made when the UE is at the cell edge is once every 50 ms, whereas the measurement made when the UE is at the cell center is once every 1 s. When the UE is at the cell center, it only measures the cell-edge sub-band of neighboring cells to prepare for the cases of link break or other error cases. These measurement results are not reported to eNodeB for handover decision. Rather, the UE uses the measurement results for cell re-selection of handover, only when UE detects a link break or poor quality of the link (e.g. from CQI report).

Figure 6:
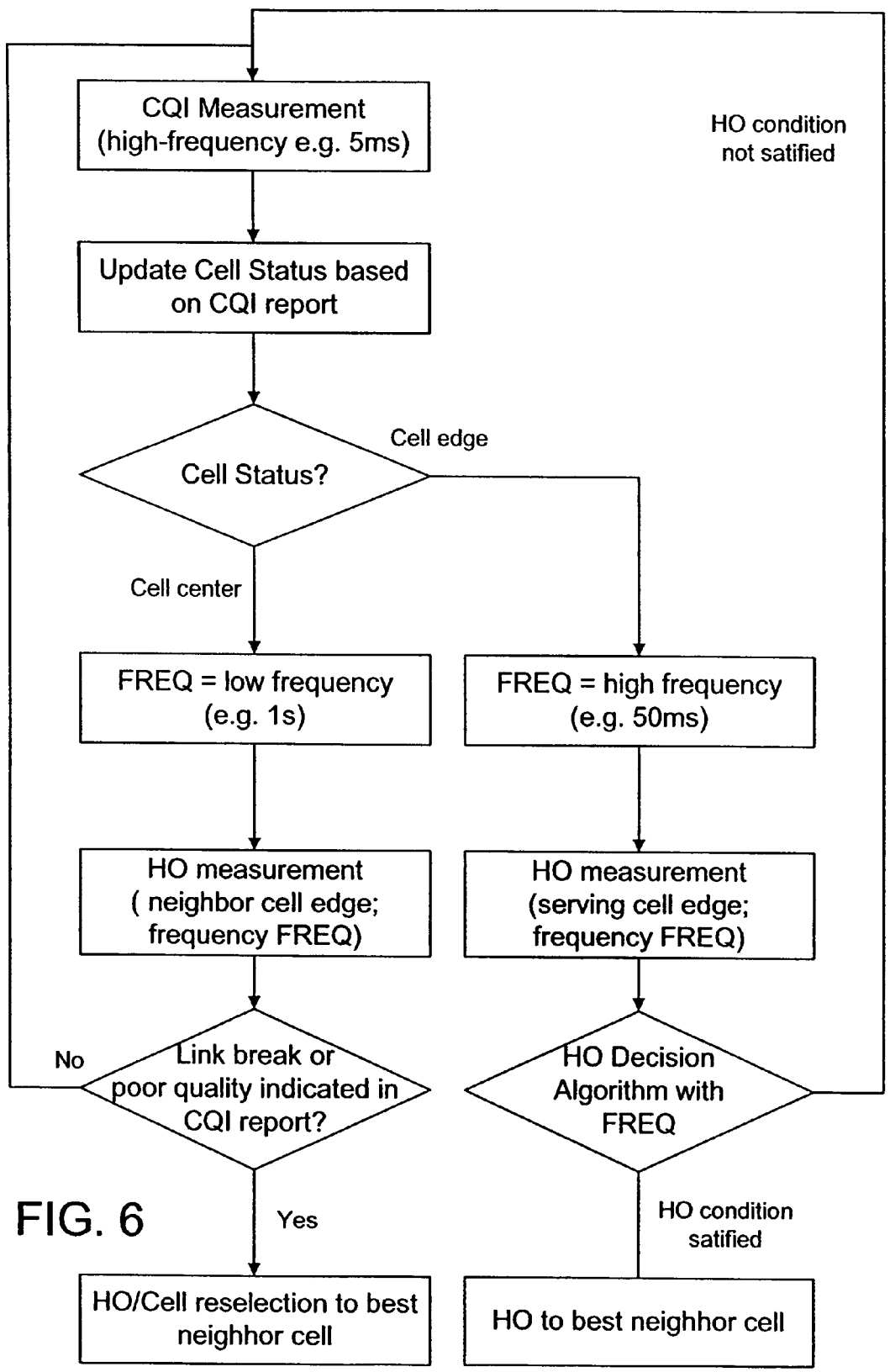
FIG. 6 is a flowchart illustrating the measurement approach, according to a different embodiment of the present invention.

The measurement in the second approach is illustrated in FIG. 6.

One of the objectives of pilot measurements for the serving frequency layer HO is to estimate the quality of data channel that may be used by the user later. However, due to the variations in radio conditions and the potential IC scheduling and scheduling differences in DL and UL (uplink), this is not always possible. The best UE measurement scheme may be different for different network IC and scheduling design and algorithms. Thus, some flexibility is needed for measurement signaling as well. Because of the frequency selectivity/diversity of OFDM symbols, there may also be some differences between the measured quality on pilot channel and the quality of data channel. One example of pilot measurements where performance difference may be seen is: UE is always assigned at RB #0 at the boundary of 10 MHz, but always uses measurement results of the pilot at central 1.25 MHz for handover usage. This pilot measurement will be much more inaccurate in comparison with using pilot measurement of pilots at RB #0.

It would be more beneficial to measure the same or nearby frequency sub-band where the UE may be used to receive data for the serving cell HO measurements. When static IC is applied, the UE tends to use the cell-edge sub-band when it is at the cell edge, and to hand over to the cell-edge sub-band of the neighboring cell, if the HO criteria are fulfilled. As such, the UE can get more accurate measurement results by measuring cell edge frequency sub-band when it is located at the cell edge.

Figure 7:
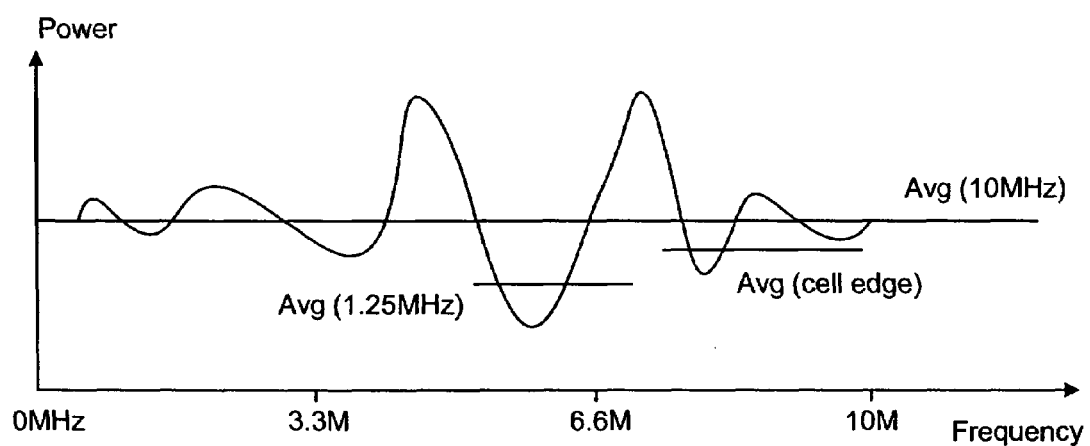
FIG. 7 illustrates the cell dependent pilot measurement when reuse-3 static IC is used.

Inter-RAT and inter-frequency measurements may be different. In inter-RAT or inter-frequency measurement, a UE may need to measure some other sub-bands (always use the highest power sub-bands, for example). Thus, in E-UTRAN, the UE should measure different sub-bands depending on the type of HO (intra-frequency, inter-frequency or inter-RAT) and IC algorithms (static or semi-static IC). Consequently, it would be beneficial to develop a measurement strategy to cover all the measurement requirements. The strategy is illustrated in FIG. 7.

In general, a UE will get different pilot power because of the effect of fast fading. When a UE knows that it will receive data at the cell edge frequency sub-band, the UE will get better measurement results if the UE measures at the cell-edge frequency sub-band instead of measuring with the cell central 1.25 MHz or full bandwidth. This measurement strategy is applicable to the case when pilot symbol or reference symbol is transmitted with constant power over the entire bandwidth. It is also applicable to the case when the same power sequence is applied to the pilot symbol as applied to the data symbol. When IC is not applied to the pilot symbol, the measurement can be made on either of 1.25 MHz, 10 MHz, or cell status dependent bandwidth. The cell status dependent measurement, according to the present invention, will increase the estimation accuracy of channel quality, and improve HO/system performance. When the same power sequence is applied to the pilot symbol as applied to the data symbol, the UE may not be able to use the fixed 1.25 MHz or 10 MHz bandwidth for HO measurement in some situations. This is because the pilots at a different sub-band are transmitted with a different power level. A simple arithmetic average increases uncertainty in the UE measurements.

In the measurement approaches, according to the present invention, the focus is on optimizing the HO/system performance in respect to DL. To improve system and HO performance when static IC is used (on either of data only or data+pilot channel), measurement of different sub-bands of the entire DL bandwidth should be carried out depending on the UE's status in its serving cell In general, the UE is always handed over from the cell edge of one cell to the cell edge of another. In the static-IC measurement scheme, usually the same power offset is applied to the cell-edge sub-band of different cells. Consequently, the results between different cells are comparable.

According to embodiments of the present invention, the time interval or periodicity for performing a handover measurement is In sum, the difference between two approaches is mainly in how to measure when a UE is within its cell center. In both approaches, the UE makes measurement at a lower measurement rate than when it is at the cell edge. In the first approach, the UE only measures the cell-edge sub-bands of neighboring cells as well as its own cell-edge sub-band. All the measurements are reported to the network for handover decision. In the second approach, the UE only measures the cell-edge sub-bands of neighbor cells when the UE is within its cell center, and the measurement results are used only in error cases where there is a link break because UE suddenly moves very fast.

The second approach realizes larger interaction between CQI measurement and HO measurement. The advantage of the second approach is its power efficiency because a UE at the cell center suspends all HO decision algorithms (e.g. event-triggered measurement report), and only measures neighboring cells at a low measurement rate. The disadvantage of the second approach is that it increases the complexity of algorithms in the UE. The UE needs to have an additional set of algorithms for measurement and for HO/cell reselection decision.

In the first approach, UE measures the serving and the neighboring cells even when it is in the cell center. But the measurement rate is very low. The advantage of the first approach is that UE can reuse the same set of HO measurement/decision algorithm for both the cell-edge and the cell-center measurements. The disadvantage of this approach is that it requires the measurement on the serving cell even when the UE is in cell center. This will consume more power compared to the second approach.

In order for the UE to recognize whether it is located in the cell center or at the cell edge, it may rely on the CQI report. In this case, the UE sends a CQI measurement report to the eNodeB, allowing the eNodeB to decide where the UE is located in the cell. In addition, the decision can be also based on some measurement quantities such as PSSI or Ec/No (Ratio of receive energy per chip to receive power density), pathloss, for example. Furthermore, if the UE knows the reuse pattern and position of the high power RB, it can derive the cell status from the allocated RB number. Alternatively, the eNodeB notifies the change of cell status by explicit RRC signaling.

If a UE is at cell center but is otherwise assigned RB's within the cell edge bandwidth, this will trigger the UE to perform measurements more frequently. However, this scenario is not likely to happen, because cell classification is fully controlled by eNodeB. For example, if in some extreme cases, according to CQI measurement report, the UE should be in cell center, the eNodeB may classify the cell status as the UE still being in cell edge because of other reasons such as heavy load in cell center. In this situation, the UE can carry the measurement more frequently than usual. Nevertheless, the measurement in this situation does not significantly change the overall approach of the present invention.

Because of the more accurate measurement, a UE will have more accurate and timely HO. This increases UE throughput and system throughput. Because the measurement frequency and bandwidth are reduced, power consumption in the UE can be greatly reduced. The present invention allows optimized handover measurements for different types of handovers, such as in the serving-frequency layer, non-serving frequency layer and in inter-RAT.

Figure 8:
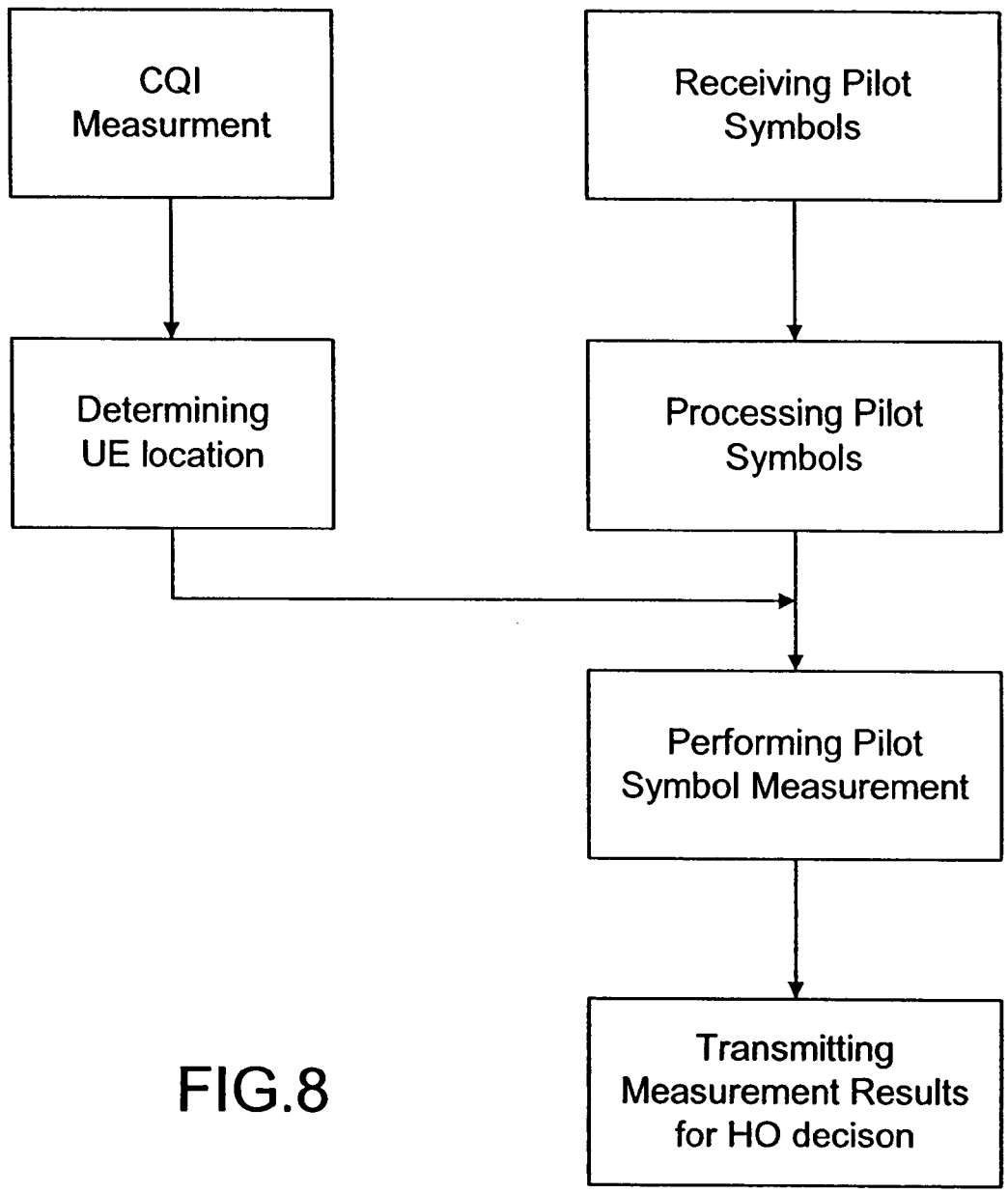
FIG. 8 shows a general process in handover measurements in a UE.

FIG. 8 shows a typical procedure in handover measurements in a UE. As shown in FIG. 8, the UE receives pilot symbols from the radio access network and processes the received pilot symbols. The UE performs pilot symbol measurements based on the pilot symbols. In additional, the UE may perform channel quality measurement so that its location in a serving cell can be determined. After the measurement, the UE transmits the measurements to another network component, such as an eNodeB for handover decision.

In sum, the present invention provides two methods of measurements for use in the handover event. The first method comprises:

processing pilot symbols in a user equipment device in a radio access network, the user equipment device located in a serving cell;

performing handover measurement over a frequency sub-band of an operating bandwidth of the serving cell and one or more different frequency sub-bands of one or more cells adjacent to the serving cell based on the pilot symbols for obtaining a handover measurement result; and conveying the handover measurement result to a network component in the radio access network for deciding whether to carry out a handover event at least partly based on the handover measurement result.

The handover measurement is at least partly dependent upon whether the user equipment device is located in the cell-center section or in the cell-edge section.

Whether the user equipment device is located in the cell-center section or in the cell-edge section at least partly based on the channel quality measurement result.

The different frequency sub-bands for performing the handover measurement on said one or more adjacent cells can be based on the channel quality measurement result, for example.

When the user equipment device is located in the cell-edge section, a cell-edge frequency sub-band is allocated to the user equipment device for downlink data reception in the user equipment device, and when the user equipment device is located in the cell-center section, a cell-center frequency sub-band is allocated to the user equipment device for downlink data reception in the user equipment device The cell-edge frequency sub-band and the cell-center frequency sub-band are used for handover measurement on the serving cell dependent upon the location of the user equipment device.

The second method comprises:

measuring channel quality of a serving cell in a radio access network for obtaining a channel quality measurement result, wherein the radio access network comprises a serving cell and a plurality of adjacent cells adjacent to the serving cell, and a user equipment device located in the serving cell, and wherein the user equipment device is configured to receive and process pilot symbols; and determining, based on the channel measurement result, whether a handover measurement based on the pilot symbols is carried out, and a time interval for performing the handover measurement.

When the channel quality of the serving cell is equal to or higher than the predetermined quality value, performing the handover measurement with a longer time interval, and when the channel quality of the serving cell is lower than the predetermined quality level, performing the handover measurement with a shorter time interval.

The handover measurement is performed at least partly based on whether the user equipment device is located in the cell-center section or in the cell-edge section, and whether the user equipment device is located in the cell-center section or in the cell-edge section at least partly based on the channel quality measurement.

Furthermore, when the user equipment device is located in the cell-edge section of the serving cell, the handover measurement is performed with a first measurement rate, and when the user equipment is located in the cell-center section of the serving cell, the handover measurement is performed with a second measurement rate smaller than the first measurement rate.

The first measurement rate can be dependent upon the moving speed of the user equipment device, for example.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A method, comprising:
processing pilot symbols in a user equipment device in a radio access network, the user equipment device located in a serving cell, the serving cell having a cell-edge section and a cell-center section;

performing handover measurement over a frequency sub-band of an operation bandwidth of the serving cell and one or more different frequency sub-bands of one or more cells adjacent to the serving cell based on the pilot symbols for obtaining a handover measurement result; and determining whether the user equipment is located in the cell-center section or in the cell-edge section at least partly based on a frequency reuse pattern in the operation bandwidth, wherein the frequency sub-band comprises a cell-edge frequency sub-band and a cell-center frequency sub-band, said method further comprising:

allocating the cell-edge frequency sub-band to the user equipment device for downlink data reception in the user equipment device when the user equipment device is located in the cell-edge section, and allocating the cell-center frequency sub-band to the user equipment device for downlink data reception in the user equipment device when the user equipment device is located in the cell-center section.

2. The method of claim 1, further comprising:
conveying the handover measurement result to a network component in the radio access network for deciding whether to carry out a handover event at least partly based on the handover measurement result.

3. The method of claim 2, further comprising:
measuring channel quality of the serving cell for obtaining a channel quality measurement result, and determining whether the user equipment device is located in the cell-center section or in the cell-edge section at least partly based on the channel quality measurement result.

4. The method of claim 1, further comprising
measuring channel quality of the serving cell for obtaining a channel quality measurement result, and determining said one or more different frequency sub-bands for performing the handover measurement on said one or more adjacent cells based on the channel quality measurement result.

5. The method of claim 1, wherein when the user equipment is located in the cell-edge section, the handover measurement is performed over the cell-edge frequency sub-band of the serving cell and said one or more different frequency sub-bands of the adjacent one or more cells.

6. The method of claim 1, wherein
when the user equipment device is located in the cell-edge section of the serving cell, the handover measurement is performed with a first measurement rate, and when the user equipment is located in the cell-center section of the serving cell, the handover measurement is performed with a second measurement rate smaller than the first measurement rate.

7. The method of claim 6, wherein the user equipment device has a moving speed, and wherein the first measurement rate is dependent upon the moving speed.

8. The method of claim 2, further comprising:
selecting one of said one or more cells for the handover event if the handover measurement result meets a predetermined criteria.

9. An apparatus, comprising:
a receiver for receiving pilot symbols in a radio access network, wherein the apparatus is located in a serving cell in the radio access network, wherein the serving cell has a cell-edge section and a cell-center section; and
a measurement module configured to perform handover measurement over a frequency sub-band of an operation bandwidth of the serving cell and one or more different frequency sub-bands of one or more cells adjacent to the serving cell based on the pilot symbols for obtaining a handover measurement result, wherein whether the apparatus is located in the cell-edge section or in the cell-center section is determined at least partly based on a frequency reuse pattern in the operation bandwidth, wherein said measurement module is also configured for performing channel quality measurement of the serving cell for providing a channel quality measurement result, said apparatus further comprising:
a determining module configured for determining, based on the channel quality measurement result, whether the handover measurement is carried out, and a time interval for the handover measurement.

10. The apparatus of claim 9, further comprising:
a transmitter for conveying the handover measurement result to a network component in the radio access network for deciding a handover event at least partly based on the handover measurement result.

11. The apparatus of claim 9, wherein the measurement module is also configured for performing channel quality measurement of the serving cell for providing a channel quality measurement result so as to determine whether the apparatus is located in the cell-edge section or in the cell-center section based on the channel quality measurement result; and wherein the handover measurement is performed at least partly based on whether the apparatus is located in the cell-edge section or located in the cell-center section.

12. The apparatus of claim 9, wherein
when the channel quality measurement result is equal to or higher than the predetermined quality value, performing the handover measurement with a longer time interval, and
when the channel quality measurement result is lower than the predetermined quality level, performing the handover measurement with a shorter time interval.

13. The apparatus of claim 9, wherein the frequency sub-band and said one or more different frequency sub-bands are determined based on the channel quality measurement result.

14. A method, comprising:
measuring channel quality of a serving cell in a radio access network for obtaining a channel quality measurement result, wherein the radio access network comprises a serving cell and a plurality of adjacent cells adjacent to the serving cell, and a user equipment device located in the serving cell, the serving cell having a cell-edge section and a cell-center section, and wherein the user equipment device is configured to receive and process pilot symbols; and
determining, based on the channel measurement result, whether a handover measurement over a frequency sub-band of an operation bandwidth of the server cell and one or more different frequency sub-bands of one or more cells adjacent to the serving cell based on the pilot symbols is carried out, and a time interval for performing the handover measurement, wherein whether the user equipment is located in the cell-edge section or the cell-center section is determined at least partly based on a frequency reuse pattern in the operation bandwidth.

15. The method of claim 14, wherein the channel quality measurement is indicative of the channel quality of the serving cell as compared to a predetermined quality value, and wherein
when the channel quality of the serving cell is equal to or higher than the predetermined quality value, performing the handover measurement with a longer time interval, and
when the channel quality of the serving cell is lower than the predetermined quality level, performing the handover measurement with a shorter time interval.

16. The method of claim 14, further comprising:
conveying the handover measurement result to a network component in the radio access network for deciding whether to carry out a handover event at least partly based on the handover measurement result.

17. The method of claim 15, further comprising:
determining whether the user equipment device is located in the cell-center section or in the cell-edge section, wherein said handover measurement is performed at least partly based on said determining.

18. The method of claim 17, further comprising:
measuring channel quality for determining whether the user equipment device is located in the cell-center section or in the cell-edge section at least partly based on said measuring.

19. The method of claim 15, wherein
when the user equipment device is located in the cell-edge section of the serving cell, the handover measurement is performed with a first measurement rate, and
when the user equipment is located in the cell-center section of the serving cell, the handover measurement is performed with a second measurement rate smaller than the first measurement rate.

20. The method of claim 19, wherein the user equipment device has a moving speed, and wherein the first measurement rate is dependent upon the moving speed.

21. The method of claim 16, further comprising:
selecting one of said one or more cells for the handover event if the handover measurement result meets a predetermined criteria.

22. A wireless communications network comprising:
a first network component, and
a second network component configured for communication with the first network component, wherein the first network component is located in a first cell adjacent to one or more second cells, each of the first and second cells having a frequency sub-band, and wherein the first network component comprises:
means for receiving pilot symbols in a radio access network, wherein the first network component is located in a serving cell of the radio access network, the serving cell having a cell-edge section and a cell-center section, and
means for performing handover measurement over the frequency sub-band of an operation bandwidth of the serving cell and one or more cells adjacent to the serving cell based on the pilot symbols, based on the received pilot symbols, and for providing handover measurement result to the second network component; and
the second network component is configured to determine whether the first network component is located in the cell-edge section on in the cell-center section at least partly based on a frequency reuse pattern in the operation bandwidth, and to decide whether to carry out a handover event for the first network component at least partly based on the handover measurement results, wherein the frequency sub-band comprises a cell-edge frequency sub-band and a cell-center frequency sub-band, and the cell-edge frequency sub-band is allocated to the user equipment device for downlink data reception in the user equipment device when the user equipment device is located in the cell-edge section, and the cell-center frequency sub-band is allocated to the user equipment device for downlink data reception in the user equipment device when the user equipment device is located in the cell-center section.

23. The wireless communication network of claim 22, wherein the handover measurement is performed at least partly based on whether the first network component is located in the cell-edge section or located in the cell-center section.

24. The method of claim 14, wherein the frequency sub-band comprises a cell-edge frequency sub-band and a cell-center frequency sub-band, wherein the cell-edge frequency sub-band to the user equipment device for downlink data reception in the user equipment device when the user equipment device is located in the cell-edge section, and the cell-center frequency sub-band is allocated to the user equipment device for downlink data reception in the user equipment device when the user equipment device is located in the cell-center section.

25. The method of claim 1, further comprising:
measuring channel quality of the serving cell in a radio access network for obtaining a channel quality measurement result, and
determining, based on the channel measurement result, whether said performing is carried out, and a time interval for said performing.

26. The apparatus of claim 9, wherein the frequency sub-band comprises a cell-edge frequency sub-band and a cell-center frequency sub-band, and wherein the cell-edge frequency sub-band is allocated to the apparatus for downlink data reception in the apparatus when the apparatus is located in the cell-edge section, and the cell-center frequency sub-band is allocated to the apparatus for downlink data reception in the apparatus when the apparatus is located in the cell-center section.

* * * * *